United States Patent [19]

Arbogast

[11] Patent Number: 5,259,340
[45] Date of Patent: Nov. 9, 1993

[54] AUTOMATIC OR SEMIAUTOMATIC CAT LITTER BOX

[75] Inventor: C. Joseph Arbogast, Mount Sterling, Ohio

[73] Assignee: Foundaway Company, Grove City, Ohio

[21] Appl. No.: 824,241

[22] Filed: Jan. 21, 1992

[51] Int. Cl.⁵ .............................. A01K 1/00
[52] U.S. Cl. ......................... 119/166; 119/165
[58] Field of Search ............. 119/165, 166, 167, 168

[56] References Cited

U.S. PATENT DOCUMENTS

| | | | |
|---|---|---|---|
| D. 289,574 | 4/1987 | Stinner | D30/99 |
| 3,621,817 | 3/1970 | Printz | 119/1 |
| 3,793,989 | 2/1974 | Clark | 119/165 |
| 3,954,086 | 5/1976 | Maness | 119/1 |
| 4,190,525 | 2/1980 | Menzel | 209/235 |
| 4,787,334 | 11/1988 | Bassine | 119/1 |
| 4,846,104 | 7/1989 | Pierson, Jr. | 119/1 |
| 4,854,267 | 8/1989 | Morrow | 119/1 |
| 4,934,317 | 6/1990 | Pourshalchi | 119/1 |
| 5,048,464 | 9/1991 | Shirley | 119/166 |
| 5,048,465 | 9/1991 | Carlisi | 119/166 |

FOREIGN PATENT DOCUMENTS

| | | |
|---|---|---|
| 297015 | 6/1988 | European Pat. Off. |
| 3943363 | 6/1990 | Fed. Rep. of Germany |
| 9014759 | 12/1990 | PCT Int'l Appl. ........ 119/167 |

Primary Examiner—John G. Weiss
Attorney, Agent, or Firm—Oblon, Spivak, McClelland, Maier & Neustadt

[57] ABSTRACT

An automatic or semiautomatic cat litter box and cleaning mechanism which is compact and simple in design is provided. The device has an enclosed housing with a pivotable top lid which can be opened to allow periodic cleaning when needed. A sifting screen is rotated by a crankshaft mechanism so as to traverse a 360° radial arc through the interior portion of the housing, passing through the soiled litter and removing the waste. When the sifting screen has completed its cycle, it stops on top of a storage container upside down so as to drop any sifted cat waste into the storage container which can be removed from the housing and the waste can be periodically disposed of. Guide tracks are also provided to direct the sifting screen as it traverses its cleaning cycle with a pair of torsion spring members which provide an energizing force to the sifting screen as it is guided along the tracks to subsequently be released with an impact force against the top portion of the storage container in order to dislodge any waste material caught in the perforations of the sifting screen.

24 Claims, 17 Drawing Sheets

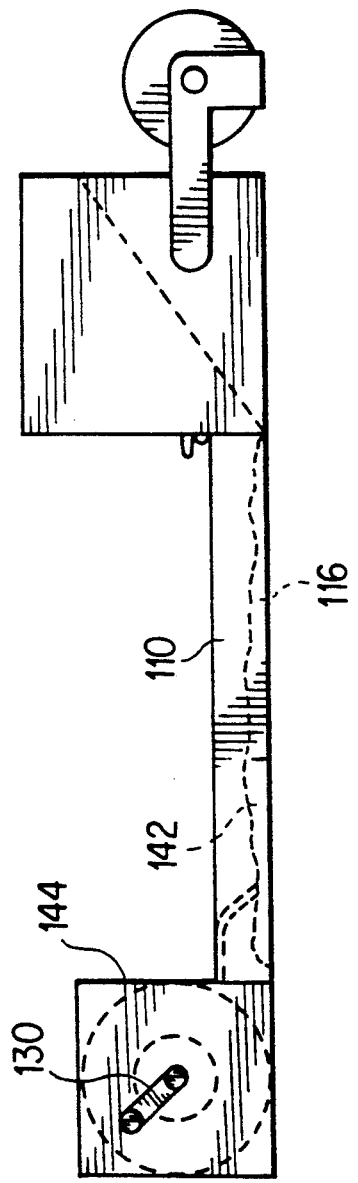

AUTOMATIC OR SEMIAUTOMATIC CAT LITTER BOX

BACKGROUND OF THE INVENTION

1. Field of the Invention

The present invention relates to an improved and efficient method of cleaning a cat litter box having a manually or power driven crankshaft which imparts a movement force to a perforated sifting screen which scrapes along the bottom of the litter box and through the cat litter to remove cat waste from the litter and then dispose of the waste in a container which is integral with the litter box.

2. Discussion of Background

In the prior art, various cat litter box cleaning devices are known which facilitate the removal of cat waste from the litter box. One such apparatus is disclosed in U.S. Pat. No. 4,190,525 to MenZel. Such an apparatus is shown in FIG. 16 of the instant application. In this device, a trough shaped container 104 is provided with a curved bottom surface and an open top. In operation and in order to remove cat waste from the litter, a screen member 122 is provided which scrapes along the bottom curved surface of the litter box and sifts through the litter while retaining the larger waste particulate matter. The means for providing movement of the screen member 122 through the litter is a crank mechanism 112 mounted on a container 104 which includes a crankshaft 114, and crank handle 118. The crank mechanism is rotatable through a full 360° radius and when the cat's waste has been sifted out by screen member 122, the screen member 122 can be removed from the crank mechanism 112 and carried to a disposal, such as a waste basket or toilet.

The prior art litter box cleaning device described above has significant disadvantages. As is apparent, the screen member 122 has to be manually detached and carried by the cat owner each time the litter box is sifted clean. This is an unpleasant task for the owner who is not inclined to touch the screen member 122 after such has been passed through the soiled litter, due to germs or waste matter on the screen member. The owner would be required to wear gloves or use paper towels in order to avoid his/her fingers from contacting with a dirty screen member, thus giving rise to an inconvenience.

Another main drawback of the device is that the litter box has an open top portion which can lead to an unpleasant odor and nuisance to the cat owner. Also, the open surface of the litter box may lead to a portion of the litter being strewn outside of the box by the cat when it paws the litter over the waste after eliminating.

A second cat litter disposal device is disclosed in U.S. Pat. No. 4,787,334, and illustrated in prior art FIG. 17 of the instant application, which shows an elongated base 110 for the cat to eliminate on, which base 110 supports a sheath 116 covered with a layer of litter 142. After the cat has soiled the litter, a crank 130 located on a receiver 144 is rotated to carry the soiled litter into the receiver and to feed an additional length of sheath 116, covered by a layer of litter 142, out onto base 110.

This device suffers a similar disadvantage as the previously described one in that it has an open top surface. More significantly and problematic, the device requires a large amount of space which may limit the number of places where it can be stored.

A third device, disclosed in U.S. Pat. No. 4,854,267, has the general drawback that it is quite complex in structure and this results in the problem of a more costly product.

Thus, there is a need in the art for an automatic or semiautomatic cat litter box with a cleaning mechanism which can remove cat waste from the box with a relatively easy-to-use apparatus which is simple in design and less costly to manufacture.

SUMMARY OF THE INVENTION

Thus, an object of the present invention is to provide a novel automatic or semiautomatic cleaning cat litter box which overcomes the problems associated with the prior art devices.

Another object of the present invention to provide the device with an enclosed housing which has a pivotable door entrance so that a cat may gain entry into the litter box.

It is another object to provide a novel crank mechanism which is leverage assisted by a torsion spring mechanism.

Another object is to provide a mechanism whereby the sifting screen is guided along a track formed in an upper portion of the enclosed housing so that the sifting screen is guided away from the door entrance while carrying the fecal matter and is eventually released from the track at the end of the cycle to thereby allow the speed of the crank mechanism to increase and project the waste into a detachable storage container.

Yet another object of the invention is to provide a novel litter box cleaning device that is both compact and simplistic in design.

The device of the present invention is provided with an enclosed housing having attached thereto a storage container which can store cat waste that has been separated from the cat litter during each cleaning cycle. The device also has a crank mechanism which serves to direct a sifting screen through the soiled litter, removing the waste and then dumping the waste into an attached storage container. The inventive cleaning mechanism has torsion spring members which urge the sifting screen along the interior of the housing as a manual or automatic force is applied to the crank mechanism in a 360° radial arc. The present invention also employs a specially shaped housing which guides the sifting screen as it traverses the rear, bottom, front and top sides of the enclosed housing to thereby maintain a close contact with the inner sides of the housing to thoroughly scrape any and all contaminated matter from the lower interior of the housing. Tracks are molded into the upper portion of the housing to guide the sifting screen and release it from engagement with the tracks toward the end of the cleaning cycle to thereby allow the force of the torsion spring members to forcefully urge the sifting screen in a downward arc against the top of the storage container, dislodging any excess litter or waste from the screen. A flexible member is also provided above the sifting screen which serves to provide a sealing mechanism to prevent odor from the storage container from reaching the interior of the litter box housing where the animal will be located. The enclosed housing has a pivotable top portion which can be lifted up after a latching mechanism is released. The latching mechanism also holds the storage container in firm engagement with the litter box housing. A door opening is also provided for the cat to gain entry into the housing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 17 shows a second conventional cleaning device which has an elongated base member which holds a layer of cat litter.

DETAILED DESCRIPTION OF THE PREFERRED EMBODIMENTS

Figure 1:
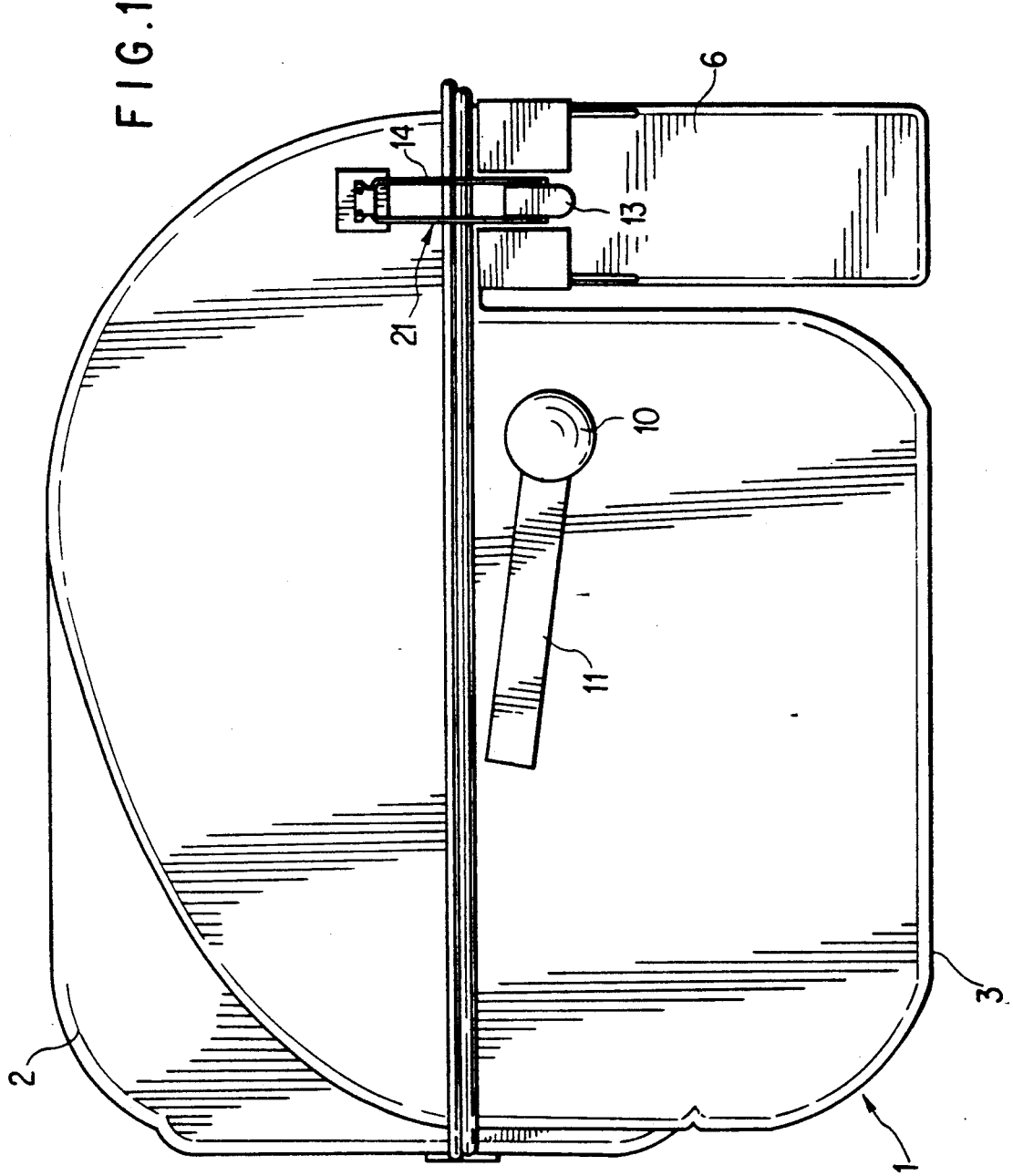
FIG. 1 is a side elevational view of the exterior of the device of the present invention showing the main housing with detachable storage container.
Figure 2:
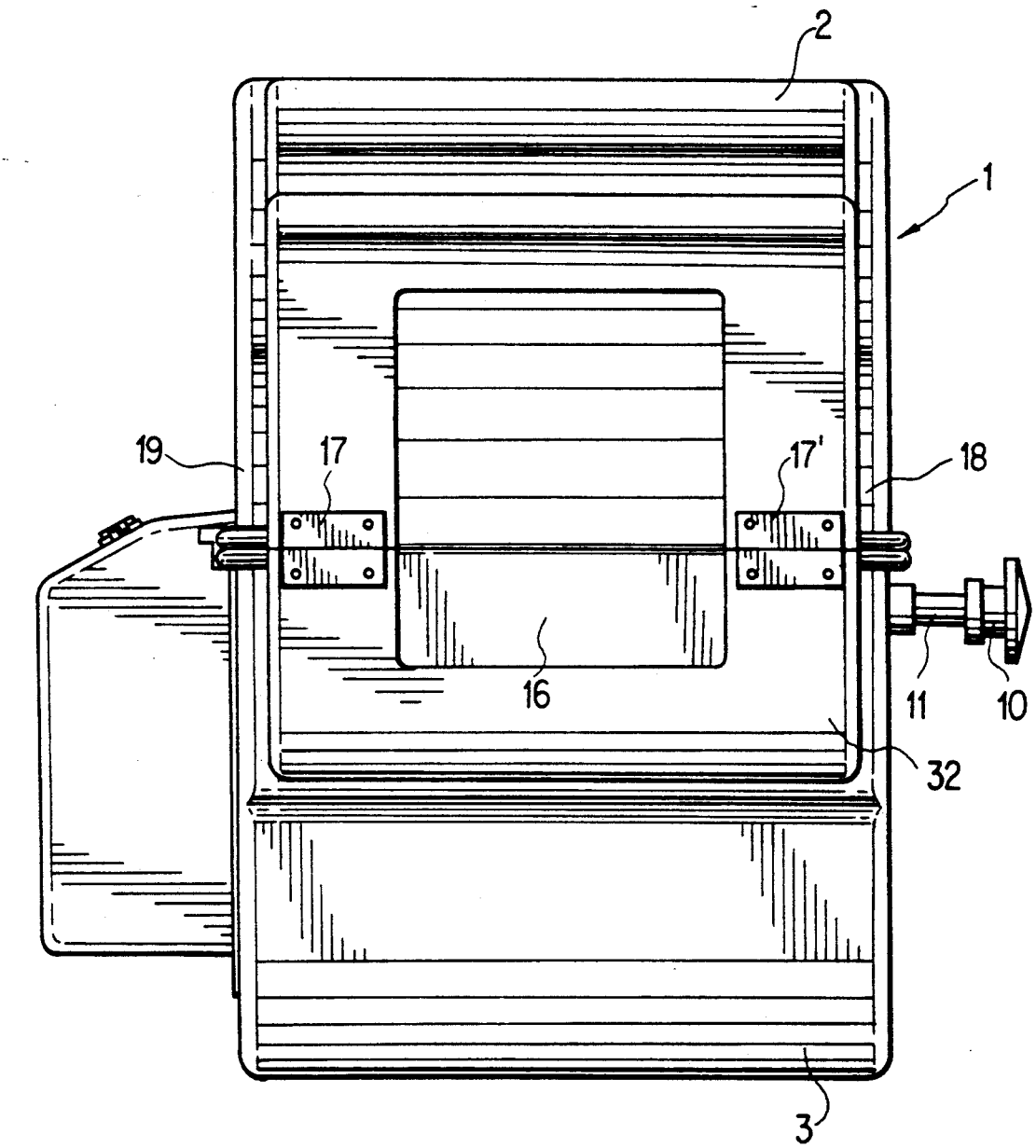
FIG. 2 is a front view of the present invention which shows the pivotal door and protruding sides of the housing.
Figure 3:
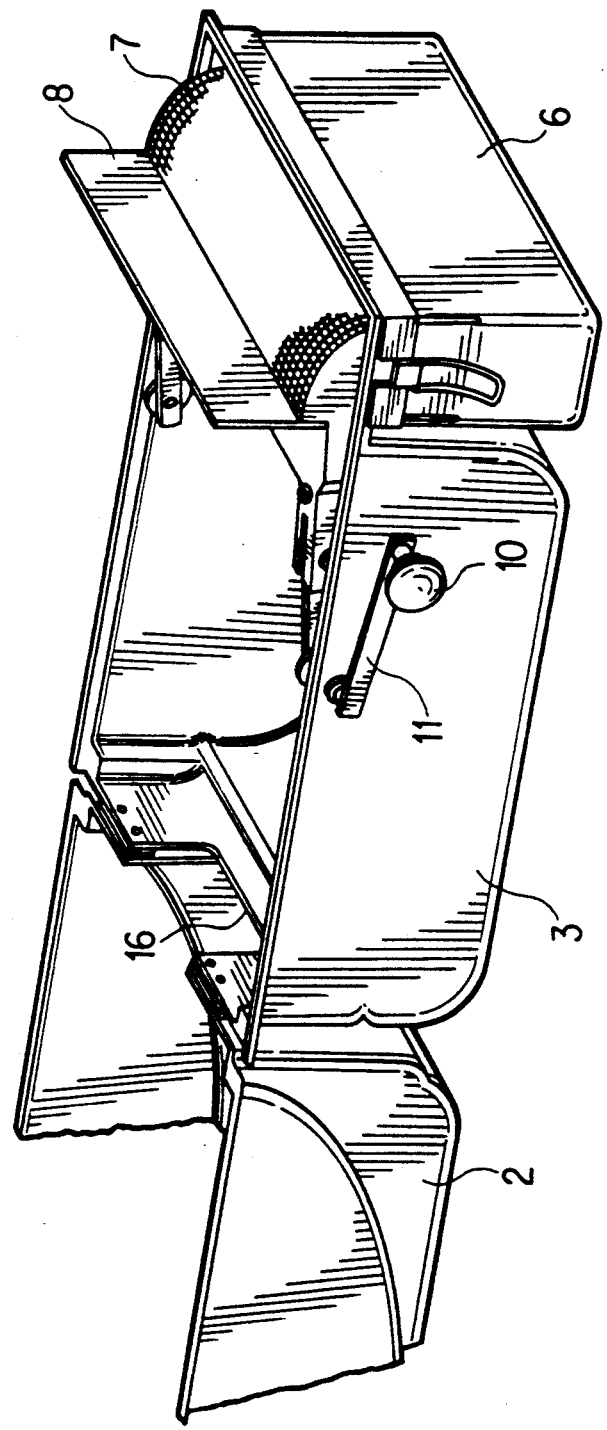
FIG. 3 shows the device of the present invention with the top portion opened to expose the sifting screen and flexible member inside the housing.
Figure 6:
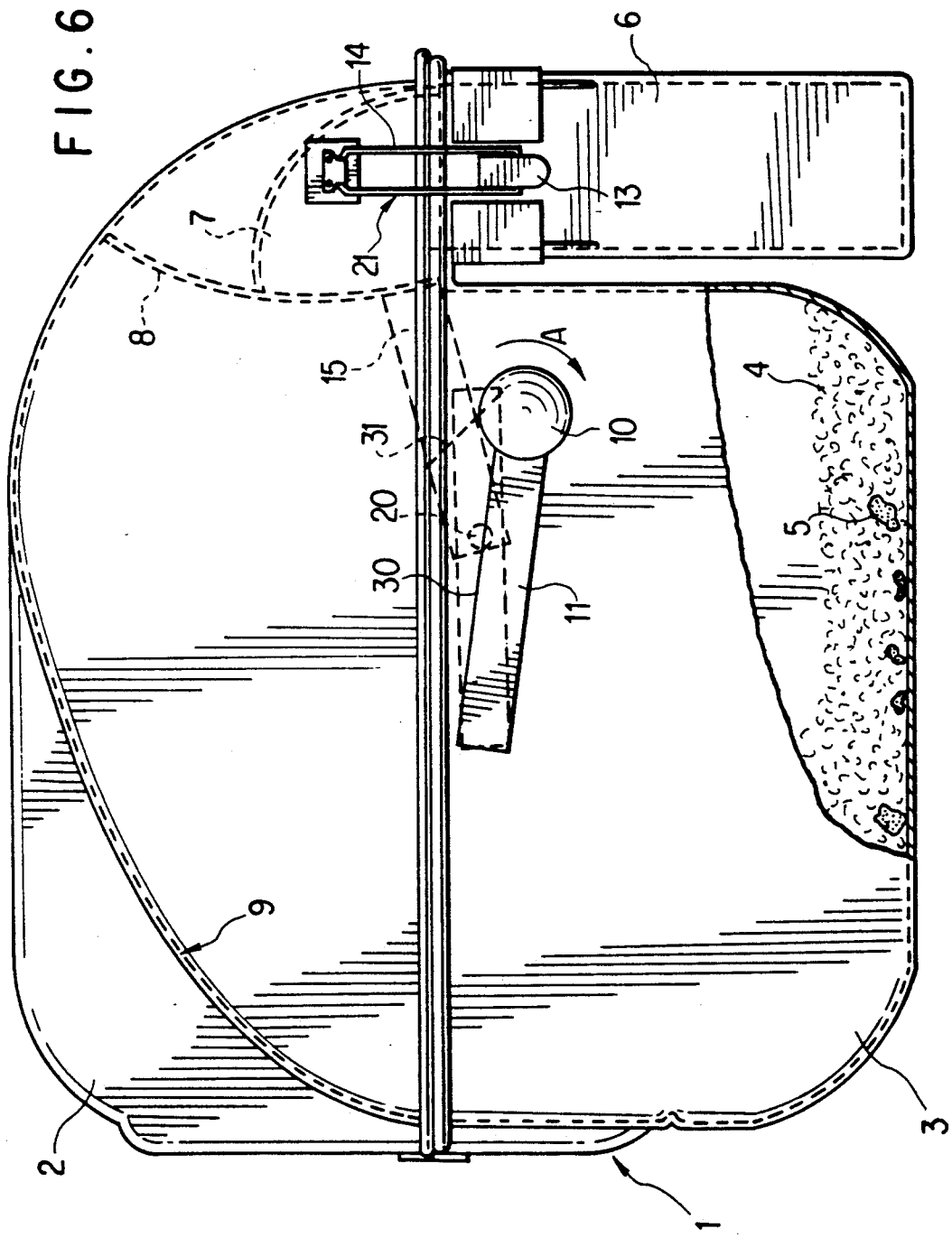
FIG. 6 is a side elevational view showing the internal structure of the device in dashed lines with the sifting screen and crank mechanism in their respective initial positions.

Referring now to the drawings, wherein like reference numerals designate identical or corresponding parts throughout the several views, the inventive device, shown generally in FIG. 1 has top and bottom portions 2 and 3, respectively, which fit together and are hingedly attached at one end by hinges 17, 17' as can best be seen in FIG. 2. A detachable waste storage container 6 is integrally connected to the top and bottom portions by means of elongated latch member 14 attached to top portion 2 of the housing 1, and hook 13 attached to the storage container 6. It should also be noted that the relative positions of the hook 13 and the latch member 14 can be reversed. By way of this latching mechanism 21, the storage container 6 can be readily removed from the housing 1 so that a plastic bag insert can be easily disposed of and replaced with a clean bag. In this manner, a sifting screen 7 which is passed through soiled litter 4 does not have to be touched by the cat owner after each use as was the case in the previously discussed prior art device to Menzel (U.S. Pat. No. 4,190,525). The present invention also has incorporated a flexible member 8 which serves to seal the area above storage container 6 so that odor is trapped in this area and prevented from reaching the rest of housing 1 where the cat enters in order to eliminate. This provides a more pleasant and sanitary environment for the animal. It can be seen from FIG. 3 that the release of latching mechanism 21 also allows the pivoting action of top portion 2 so as to expose the interior of housing 1 in order to change the litter 4 when such replacement is necessary. FIG. 6 shows track 9 which guides the sifting screen 7 along as it traverses the upper portion of its 360° radial arc. The interaction of the track 9 and sifting screen 7 will be described in greater detail later. FIG. 2 shows in a front view of the inventive device, protruding portions 18 and 19 which make the central portion of the litter box housing 1 wider, decreasing the possibility of the cat's fur contacting the side walls of the housing 1 and being soiled by excess litter 4 or waste 5 which may accumulate on the lower interior portion of the housing 1. In this manner, the overall cleanliness of the cat is enhanced. FIG. 2 also shows pivotal door 16 through which the animal can enter the housing 1. The door 16 is attached at the top and pivots upward when pushed in by the cat.

Figure 4:
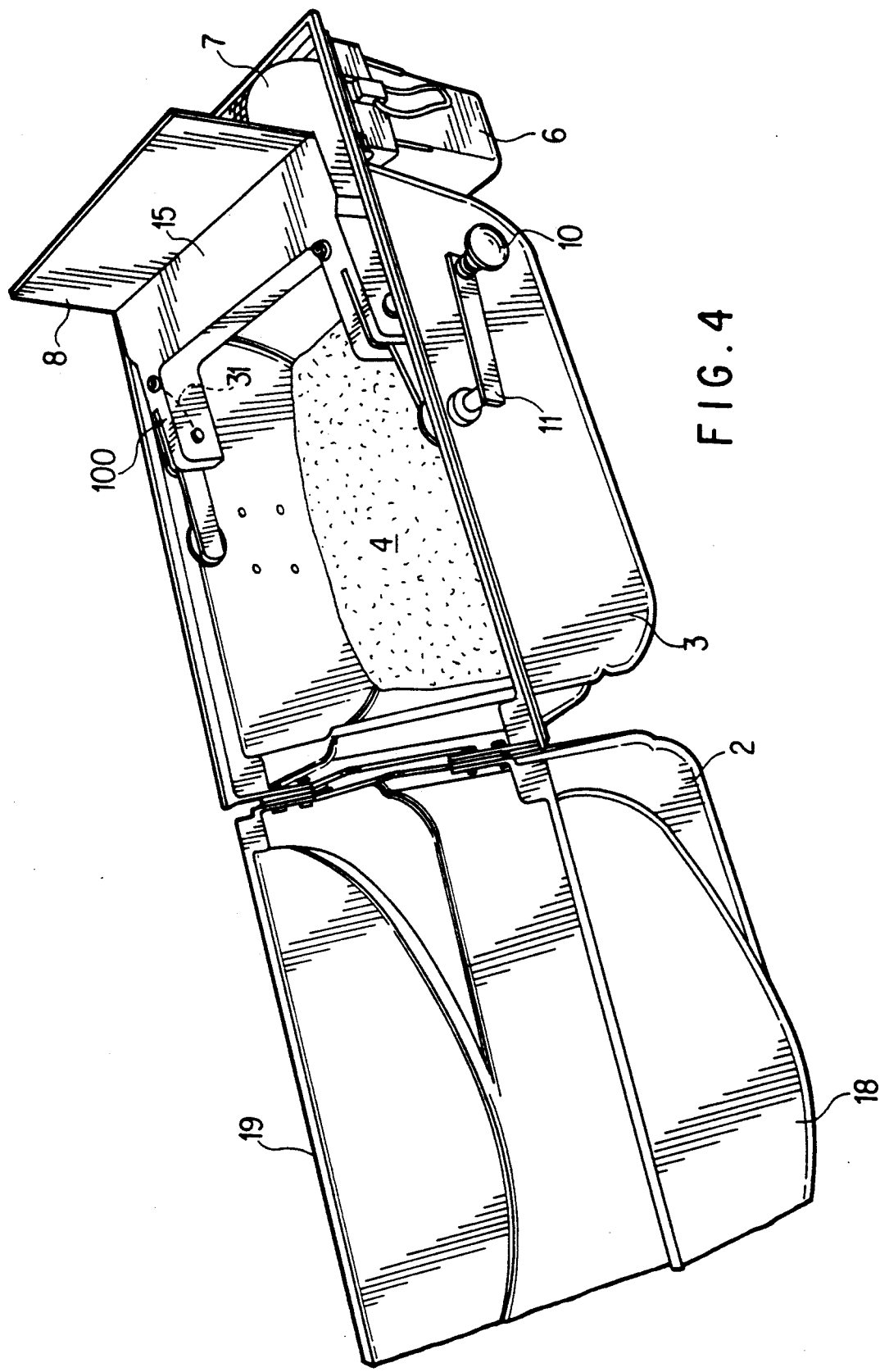
FIG. 4 also shows the interior structure of the device of the present invention, along with a view of the cranking mechanism and torsion spring members.
Figure 5:
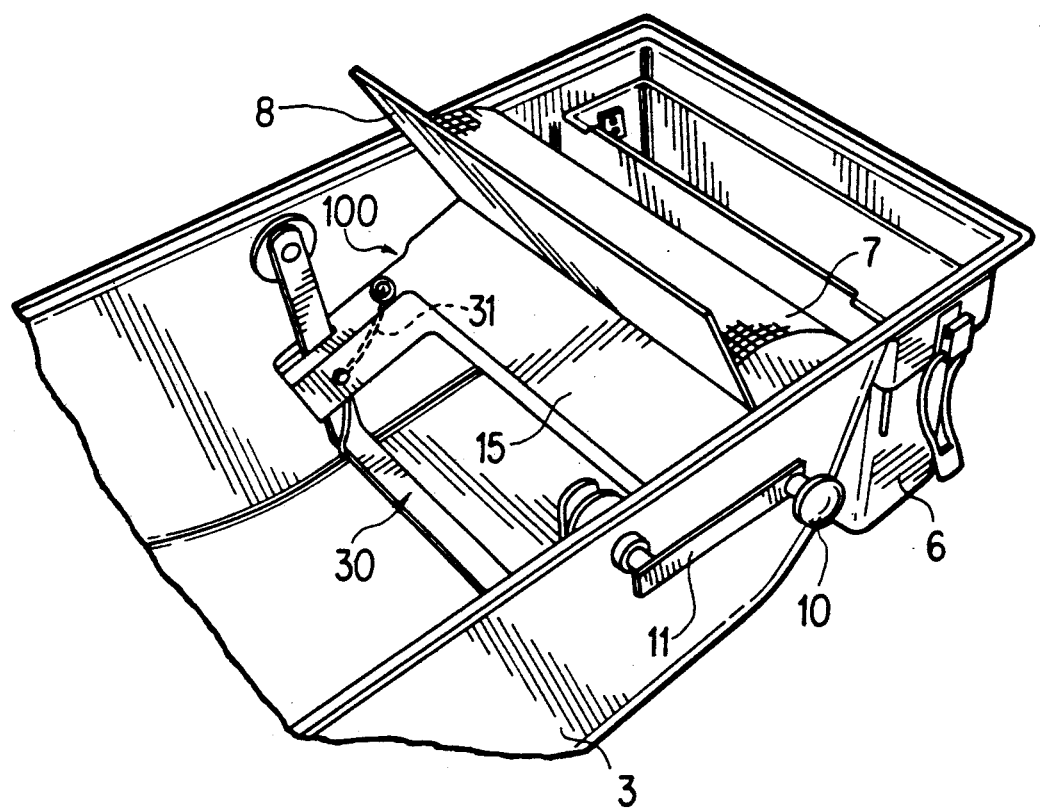
FIG. 5 shows a top view of the inventive device of FIG. 4 where the torsion spring members are shown for the structure of the attachment means between the crankshaft and the sifting screen is shown.

The crank mechanism 100 for imparting force manually or automatically to the sifting screen 7 consists of a crankshaft 11 pivotally attached to the exterior of the housing 1 having a crank handle 10 which an operator rotates in the direction A shown in FIG. 6. Inside housing 1 is an intermediate U-shaped member 30 which rotates together with crankshaft 11 as crankshaft 11 turns in direction A. As can be seen from FIG. 4, attaching member 15 is fixedly attached to sifting screen 7 and is attached to U-shaped member 30. Torsion spring members 31 are wrapped around U-shaped member 30 and also secured to attaching member 15 so that when torsion spring members 31 urge against U-shaped member 30 by the rotation of crankshaft 11 in the direction A, attaching member 15 is pulled along and trails behind crankshaft 11. As can be seen from FIG. 7, torsion spring members 31 which are connected to the sides of U-shaped member 30 and attaching member 15, have sufficient length to cause attaching member 15 and sifting screen 7 to follow behind crankshaft 11 and be pulled in a 360° radial arc. FIG. 6 also shows one of the tracks 9 which will serve as a guide for sifting screen 7 to slide along and maintain close contact with the upper portion of the interior of housing 1.

Figure 7:
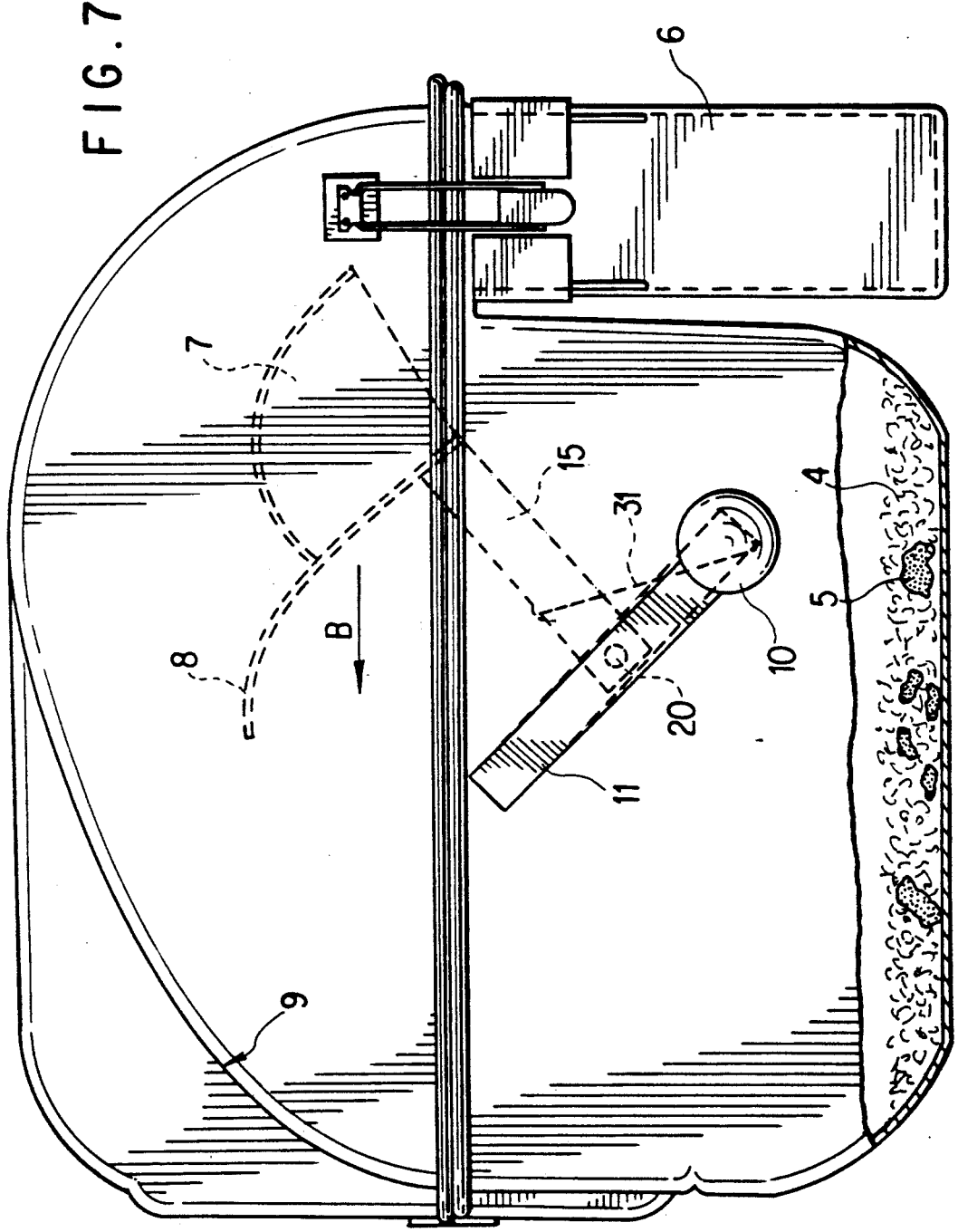
FIG. 7 shows the feature of the pivoting points whereby the sifting screen is pulled away from the storage container in direction B to begin its cleaning cycle.
Figure 8:
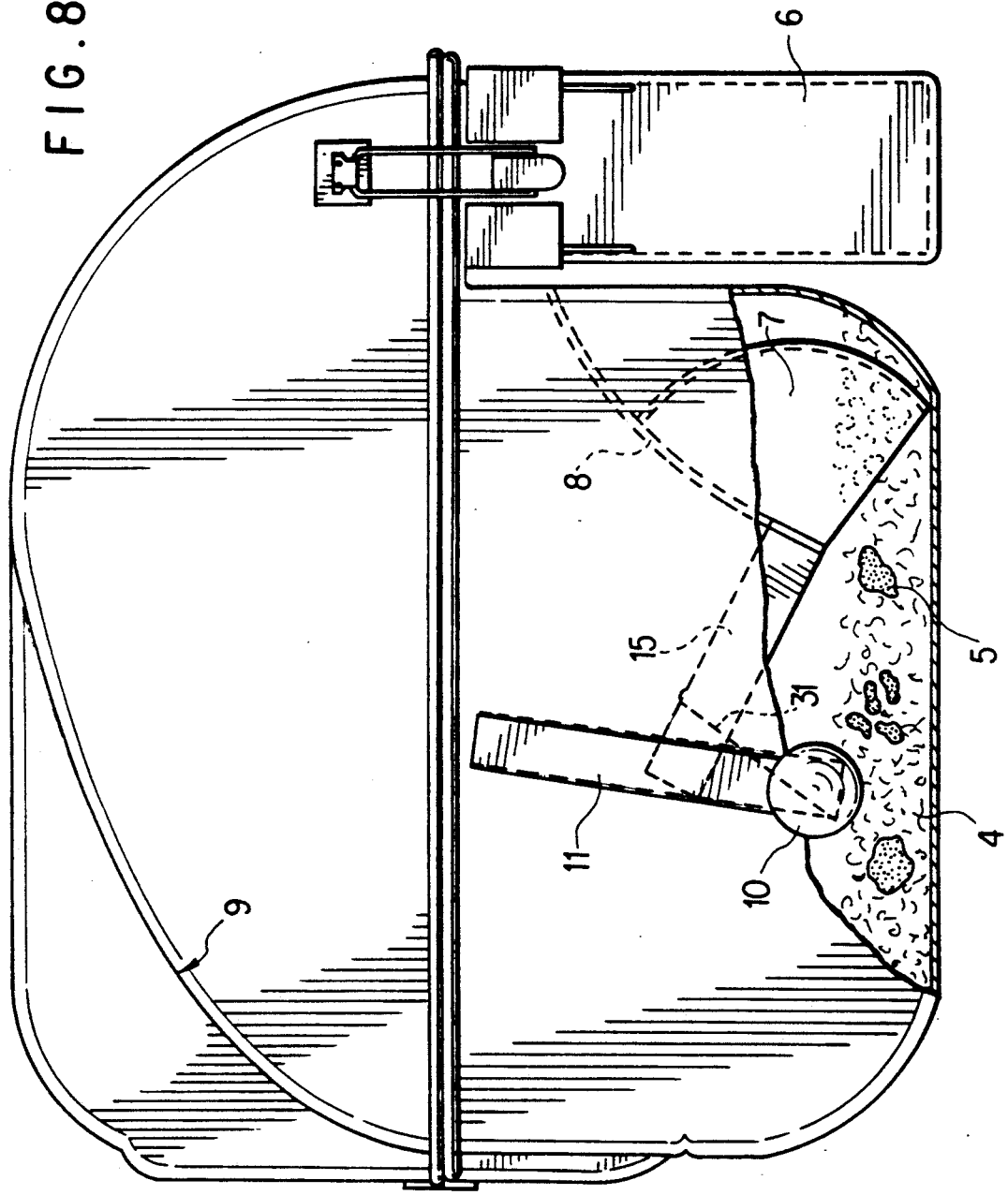
FIG. 8 shows the sifting screen during its cleaning cycle as it begins to scrape the bottom portion of the housing and litter.
Figure 9:
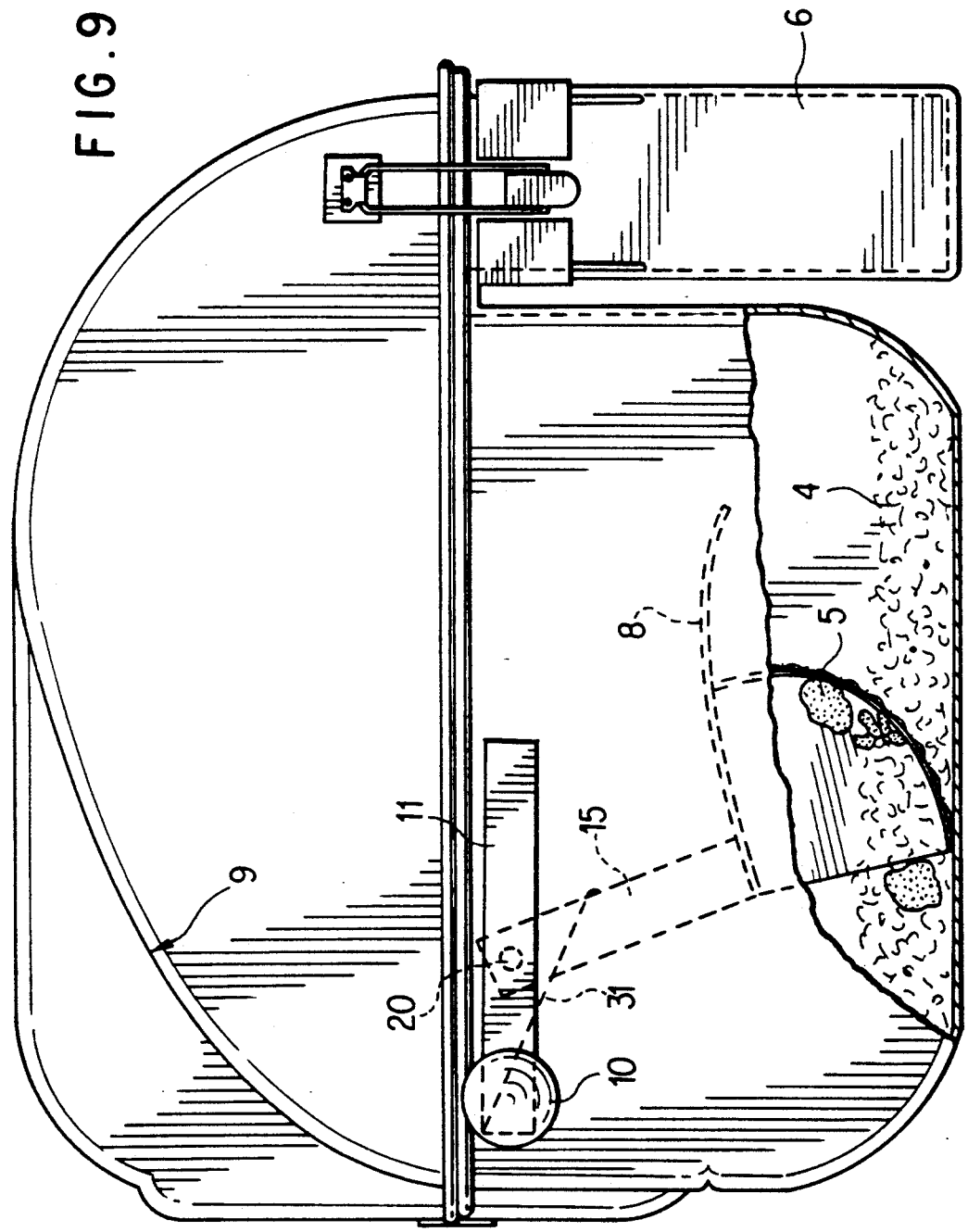
FIG. 9 shows the sifting screen in its intermediate position within the litter.
Figure 10:
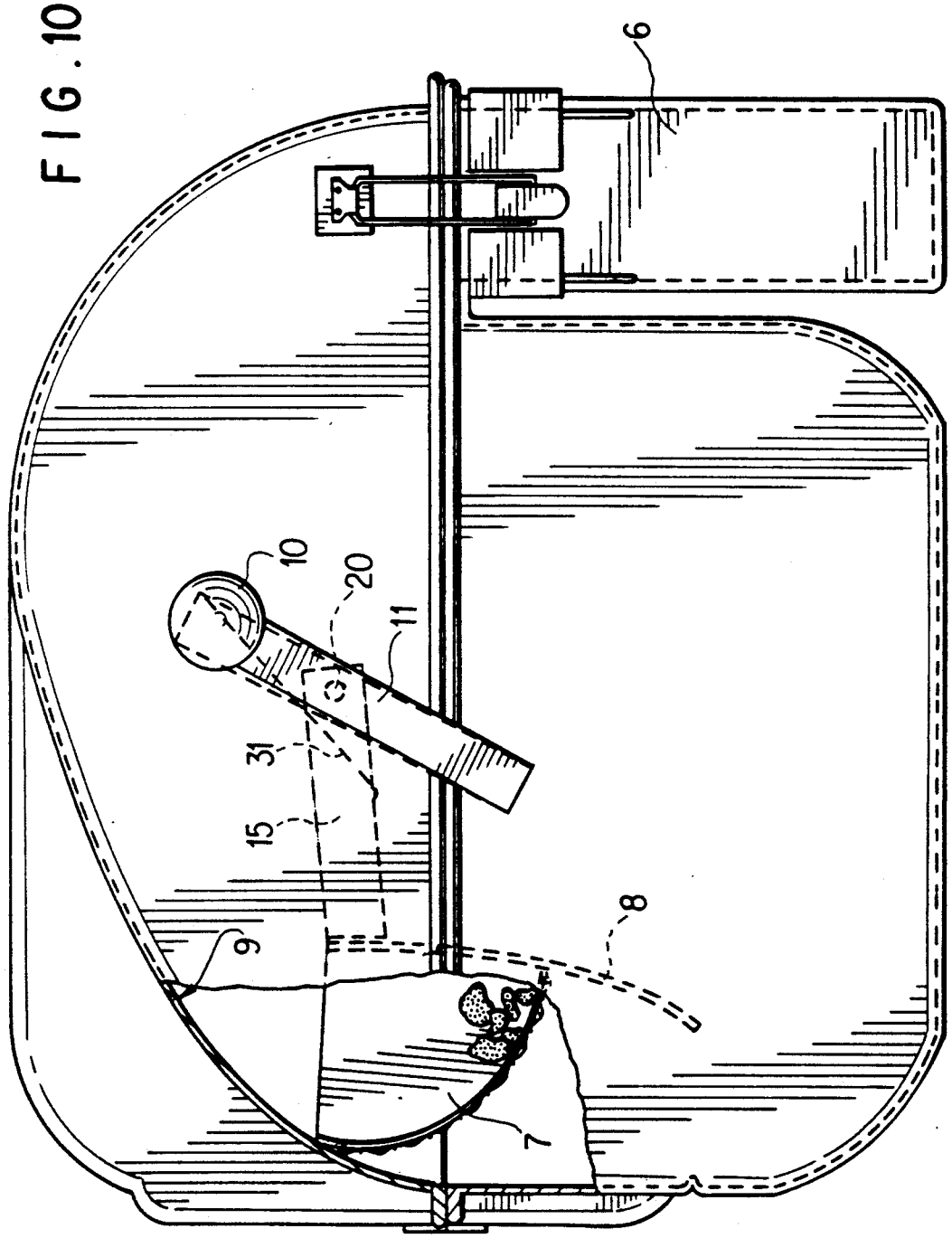
FIG. 10 shows the sifting screen as it begins to be guided along the guide tracks.
Figure 11:
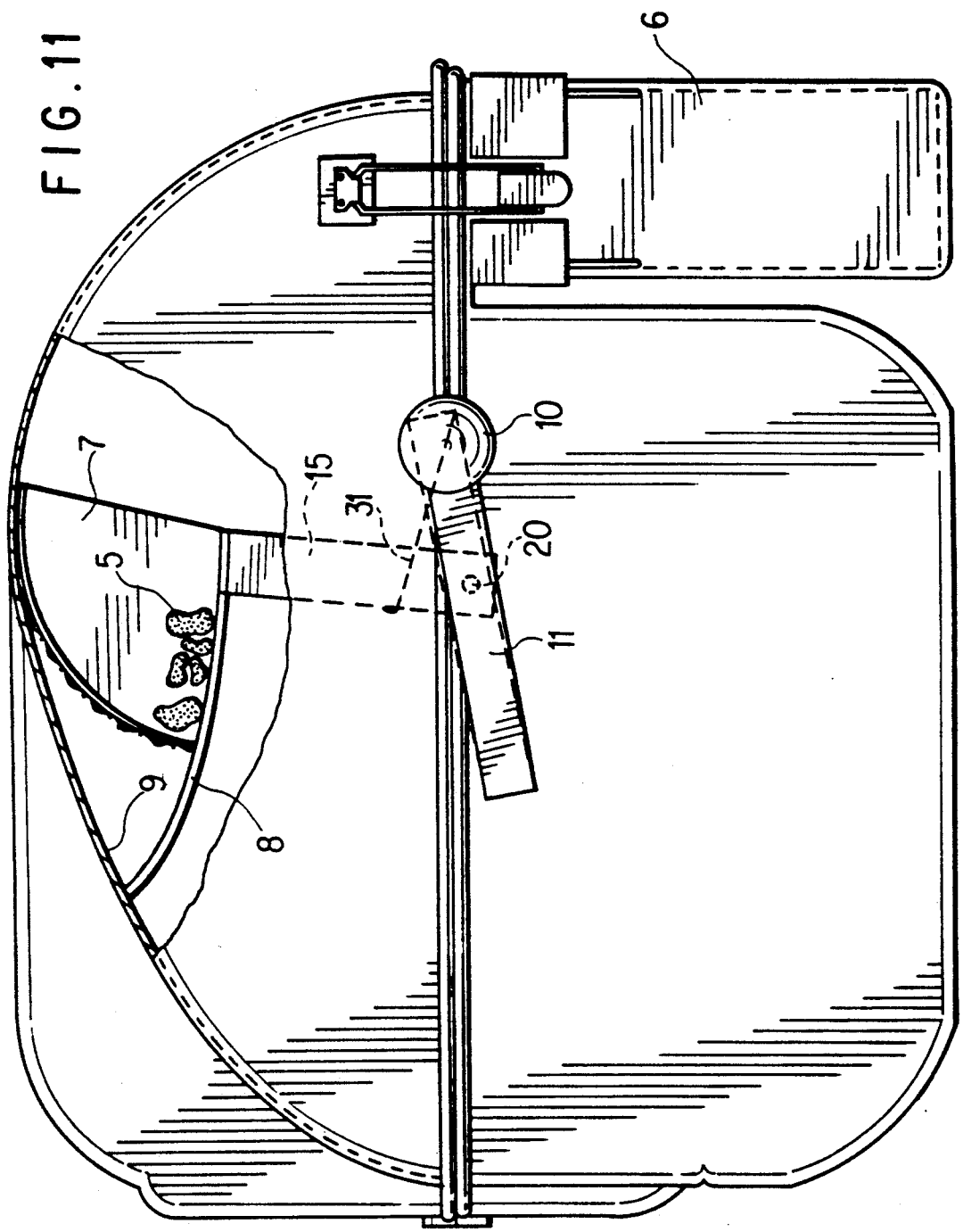
FIG. 11 shows the sifting screen in its position where it is about to be discharged from the engagement with the guide tracks.
Figure 12:
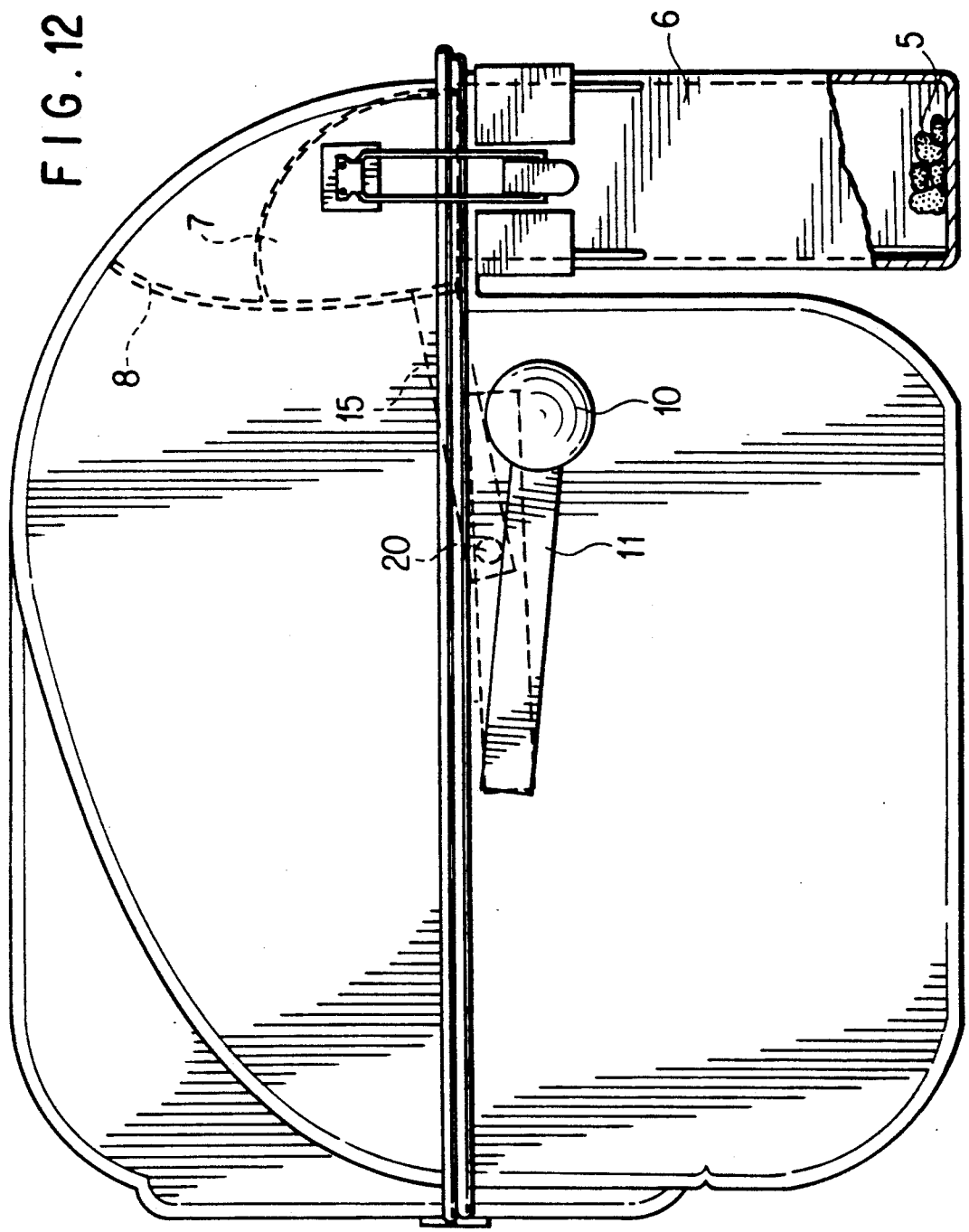
FIG. 12 shows the sifting screen in its final position after it has dislodged the waste material into the storage container.

The operation of the device will now be described with reference to FIGS. 6-12. In FIG. 6, the sifting screen 7 and crank handle 10 are in their respective initial positions in relation to housing 1. When an operator begins to rotate crank handle 10 in the direction A, crankshaft 11 and U-shaped member 30 rotate together a short distance until torsion spring members 31 cause attaching member 15 to be pulled downward away from storage container 6 along with sifting screen 7. At this moment, U-shaped member 30 pivots away from attaching member 15 about pivot point 20. Torsion spring members 31 continue to urge attaching member 15 and sifting screen 7 in direction B as shown in FIG. 7 away from contact with storage container 6. The rotation of crankshaft 11 is continued as the sifting screen 7 is pulled along behind crankshaft 11 and U-shaped member 30. Torsion spring members 31 maintain a steady engagement between U-shaped member 30 and attaching member 15. As the sifting screen is urged along the rear side, bottom, and front side of housing 1, the torsion spring members 31 maintain a close pressure contact of the sifting screen 7 with the interior portions of housing 1 to thoroughly scrape the bottom and lower side portions of the housing 1. The shape of housing 1 serves to guide the sifting screen along the bottom of the housing so as to scoop and sift the entire layer of litter 4. At the point of engagement between the sifting screen 7 and tracks 9, which are located on the upper portion 2 of the housing 1, there is a high tension force imparted on the crankshaft 11 as the tracks 9 provide a resistance against the rotation of crankshaft 11 by means of strong frictional contact on sifting screen 7. When the sifting screen 7 reaches the point shown in FIG. 11 it is released from frictional sliding engagement with the tracks 9 and the sifting screen 7 and attaching member 15 freely rotate around to the final position shown in FIG. 12 with the sifting screen 7 coming down forcefully against the top of storage container 6, thus releasing the cat waste 5 which has been sifted out of the litter 4. It should be noted that the use of the torsion spring members 31 provides a leveraged force against the flat bottom of housing 1 and molded guide tracks 9. The molded guide tracks 9 also allow sifting screen 7 to follow a different path from the upper perimeter shape of the housing 1. This allows the sifting screen 7 to be pulled along a path away from the cat door 16, preventing unwanted litter escape. The tracks 9 also allow the torsion spring members 31 to release energy at the end of the cleaning cycle, which energy release increases the impact force of the sifting screen 7 against the top of storage container 6 to facilitate the dislodging of trapped solid waste material 5. The flexible member 8 can also be seen from FIG. 12 to provide a sealing action above sifting screen 7 to keep in odor which may emanate from storage container 6. The owner can also periodically remove storage container 6 by unlatching latch mechanism 21 and disposing of a plastic bag insert. The housing 1 also has a protruding front portion 32 which provides easy access for the cat and keeps excess litter 4 away from pivotal door 16.

Figure 13:
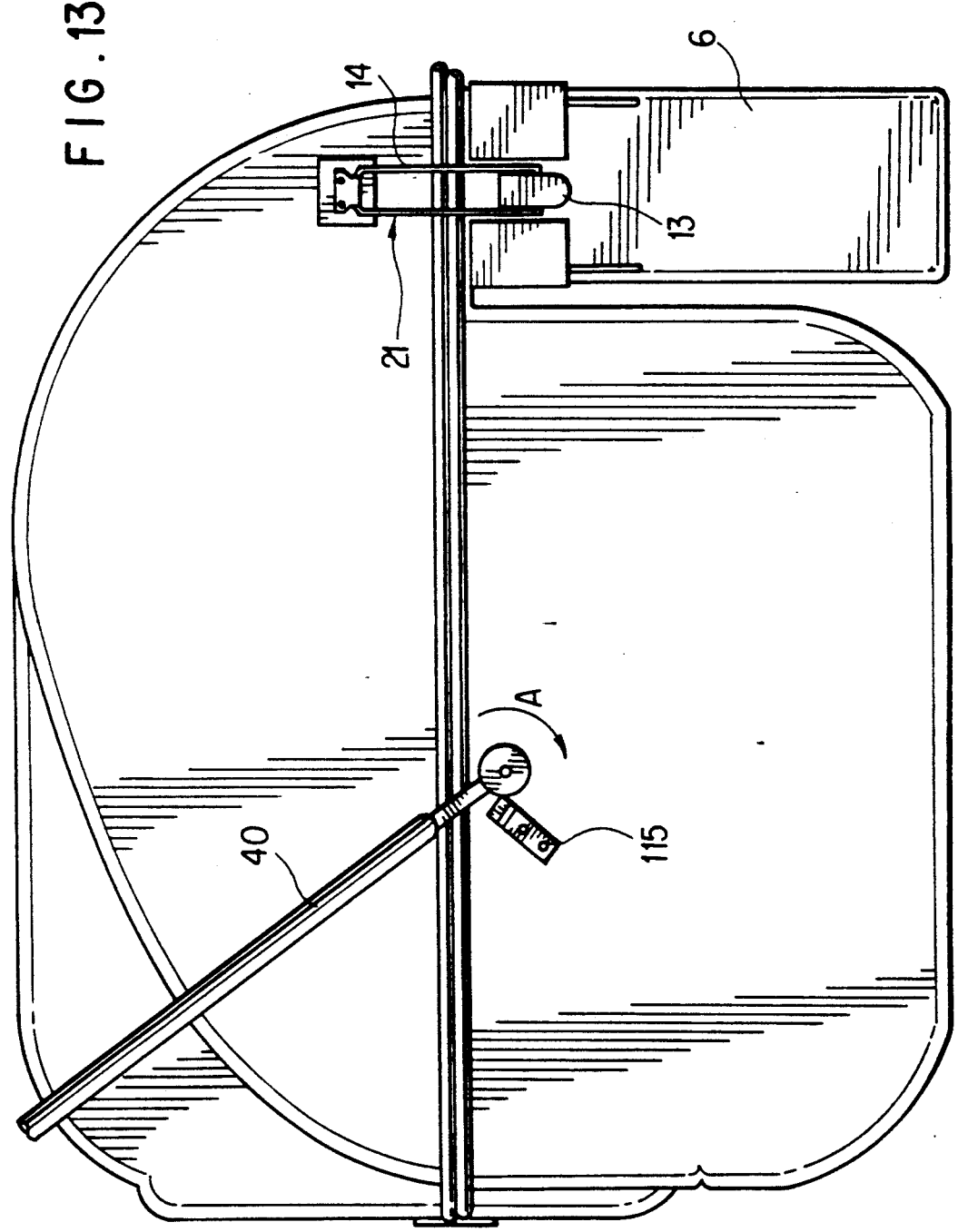
FIG. 13 shows an alternative embodiment of the present invention where the cranking mechanism consists of a ratchet handle member.

In another embodiment, shown in FIG. 13, a ratchet handle 40 is attached to the side protruding portion 18 in place of crankshaft 11 and crank handle 10. The provision of this elongated ratchet handle 40 allows a much easier rotation of the inner components which can be performed by an operator while standing up. An operator rotates ratchet handle 40 in direction A which causes the sifting screen 7 to begin its clockwise cleaning cycle, and then pulls handle 40 back until it contacts stop 45 and then repeats the steps until the sifting screen 7 traverses the entire cycle.

Figure 14:
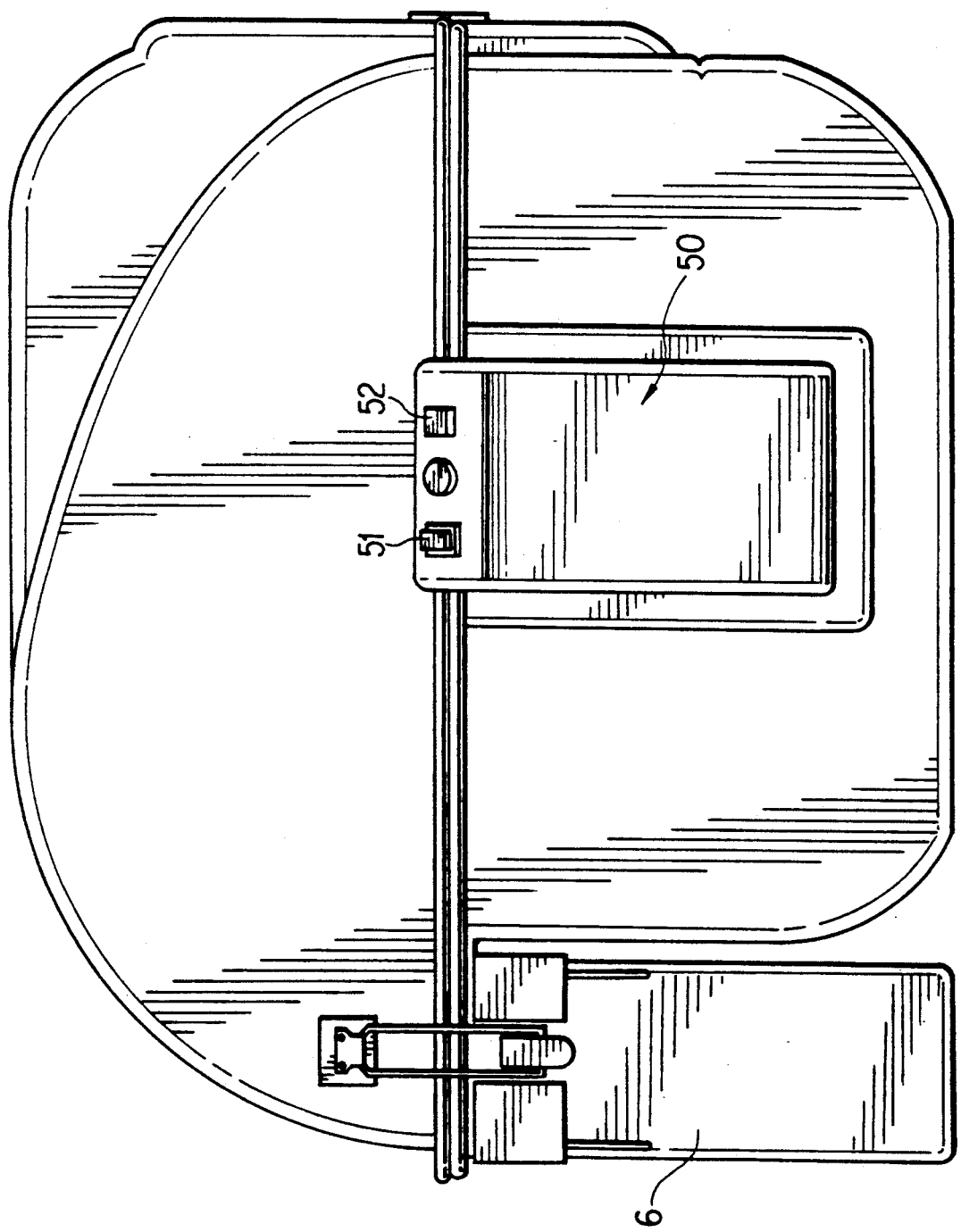
FIG. 14 is another embodiment of the present invention where the cranking mechanism is performed by means of a gear motor fixedly attached to a side of the housing.

In yet another embodiment, an automatic cleaning cycle is provided as manually rotated handle cranks are replaced with a gear motor 50 as shown in FIG. 14. When an operator pushes start button 51, light 52 goes on while the sifting screen 7 is rotated through its entire 360° cycle. When the sifting screen reaches the end point in the cycle, a well known mechanical type sensor cuts off the power to gear motor 50 and the driving of sifting screen 7 is stopped. In one embodiment, a 2 to 3 rpm gear motor 50 is provided along with a cam operated microswitch. The gear motor cover 51 is provided with a momentary contact switch to provide energy for the start of the operation with a 1 amp fuse.

Figure 15:
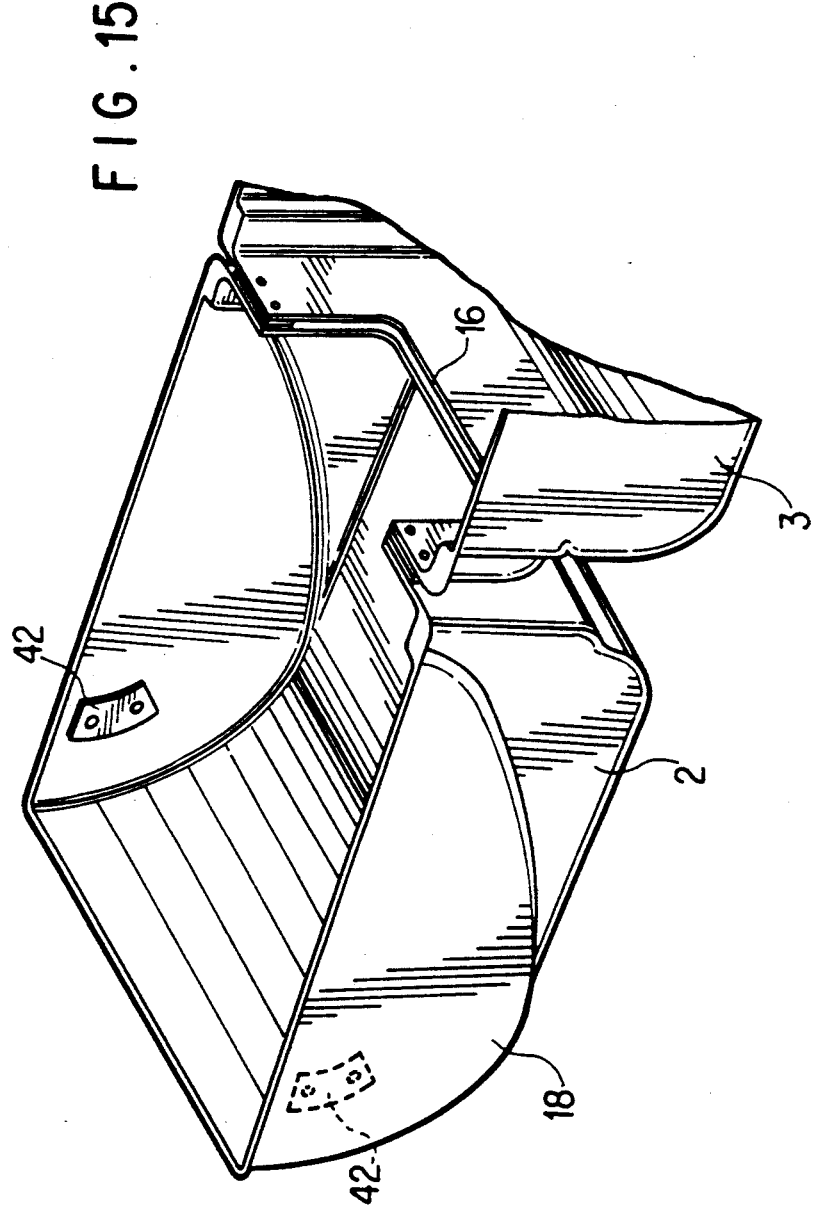
FIG. 15 is a view showing the interior of top portion of the housing in order to show braking pads which make up another part of the present invention.
Figure 16:
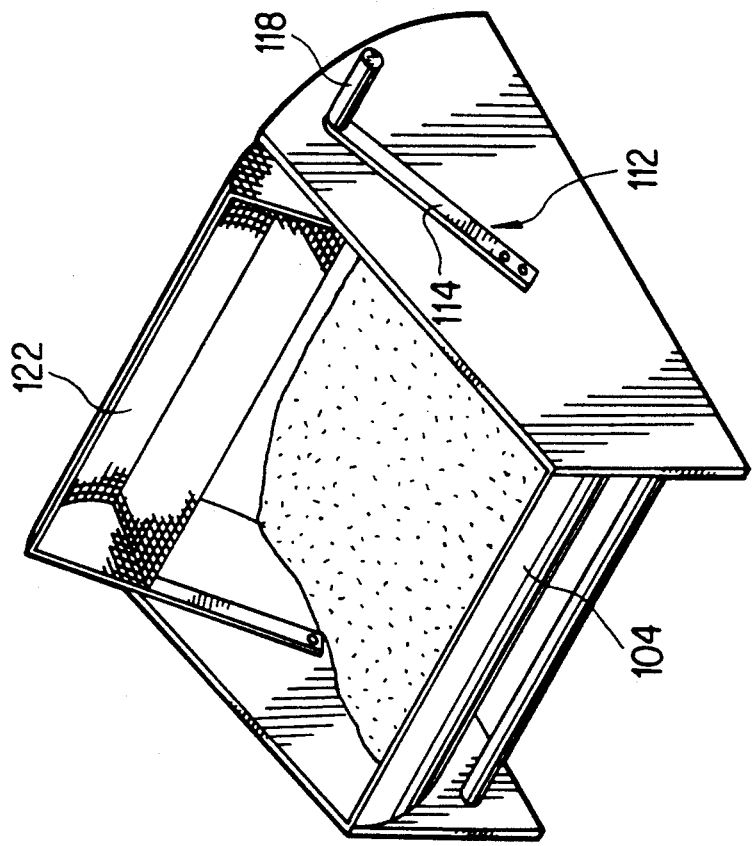
FIG. 16 shows a conventional cat cleaning mechanism with a sifting screen and cranking shaft.

In any of the above described embodiments, braking pads 42 may be provided on either side of the housing 1 at the position shown in FIG. 15. The function of these braking pads 42 is to slow the impact force at which sifting screen 7 contacts the storage container 6. The braking pads 42 dissipate excess energy beyond that which is required to dislodge the cat waste matter 5 from the perforated sifting screen 7. In other words, the tension force required to keep the sifting screen 7 in constant contact with the bottom of housing 1 is much greater than that needed to provide the dislodging impact. Thus a need for the braking pads 42 exists in order to provide a quieter operation. The braking pads 42 are made from a plastic or foam material and are molded into the inner top portion 2 of housing 1, or are inserted at a later time by means of fastening screws or the like.

In conclusion, it should be noted that the above described semiautomatic or automatic cat litter box is designed to make cleaning the box a quick and easy matter, taking only about 10 seconds a day. This litter box will work most effectively with the newer style "clumping" litter, which causes cat urine to form clumps which can be removed by sifting screen 7 along with any solid waster matter 5.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for a pet to eliminate in, comprising:
   a housing adapted to hold granular pet litter;
   a sifting screen for passage through said litter;
   a storage container mounted to said housing for disposal of said waste material into said storage container; and
   a means mounted to said housing for moving said sifting screen through the litter and to the storage container;
   wherein said means for moving comprises a crank mechanism mounted to said housing and including a crankshaft which is movable along an arcuate path to cause said sifting screen to pass through said litter and dispose of any waste material which has been collected in said sifting screen into said storage container.

2. The apparatus according to claim 1 wherein said storage container is detachably fixed to said housing by a latching mechanism.

3. The apparatus according to claim 1 wherein said housing has top and bottom portions which are pivotally attached to each other so as to allow an interior portion of said housing to be exposed by the opening of said top portion of said housing.

4. The apparatus according to claim 1 wherein said crank mechanism further includes at least one attaching member, said attaching member being fixedly connected to said sifting screen.

5. The apparatus according to claim 4 including said crank mechanism further includes a U-shaped member which moves in synchronization with said crankshaft and is operatively connected with said at least one attaching member.

6. The apparatus according to claim 5 including a torsion spring member having first and second ends, said first end being secured to said U-shaped member and said second end being secured to said at least one attaching member.

7. The apparatus according to claim 5 wherein said U-shaped member and said at least one attaching member are pivotally attached at a point whereby said U-shaped member and said at least one attaching member can pivot away from each other.

8. The apparatus according to claim 1 further comprising at least one braking pad integral with an interior top portion of said housing for braking an excess force of said sifting screen as said sifting screen is forced downwardly against said storage container.

9. An apparatus for a pet to eliminate in, comprising:
a housing adapted to hold granular pet litter;
a shifting screen for passage through said litter;
a storage container mounted to said housing for disposal of said waste material into said storage container; and
a means mounted to said housing for moving said sifting screen through the litter and to the storage container
wherein said sifting screen has a flexible member fixedly attached thereto, said flexible member providing a sealing function of a region above said storage container so as to seal said region from an interior portion of said housing to thereby prevent odor from escaping said region.

10. An apparatus for a pet to eliminate, comprising:
a housing adapted to hold granular pet litter;
a sittig screen for passage through said litter;
a storage container mounted to said housing for disposal of said waste material into said storage container; and
a means mounted to said housing for moving said sifting screen through the litter and to the storage container wherein said housing includes track means formed integral with a portion of said housing, said track means serving to guide said sifting screen as said sifting screen traverses an interior portion of said housing.

11. The apparatus according to claim 10 wherein said track means are molded into a top portion of said housing.

12. The apparatus according to claim 11 wherein said track means is formed so as to cause said sifting screen to gain momentum as it nears an end of a circular path which said sifting screen traverses in an interior perimeter of said housing.

13. A cat litter box comprising:
a housing having an opening for a cat to gain access into said housing said housing including an at least partially enclosed top;
a waste removal scoop mounted within said housing for removing cat waste material from a layer of litter disposed on a bottom side of said housing;
a storage container for storing said cat waste material; and
a transport device for transporting said waste removal scoop with respect to said housing and along a path within said housing, wherein said path traverses a low portion of said housing to cause said waste removal scoop to remove waste and to hold said waste upon said scoop as said waste removal scoop passes through a supply of litter located in the bottom side of the housing, and wherein downstream of said lower portion of said housing said path traverses an upper portion of said housing adjacent the at least partially enclosed top and toward said storage container for depositing the waste removed by said waste removal scoop with said waste removal scoop retaining the waste as it moves along said upper portion and toward said storage container means.

14. The cat litter box according to claim 13 further including at least one torsion spring for facilitating movement of said waste removal means along said path.

15. The cat litter box according to claim 13 including means for detachably mounting said storage container to said housing.

16. The cat litter box according to claim 15 further comprising a member to seal in an odor emanating from said storage container when said storage container contains cat waste material.

17. The cat litter box according to claim 13 wherein said opening comprises a pivotally attached door means which facilitates a sealing o odor inside said housing from escaping to outside air.

18. The apparatus according to claim 13 wherein said transport device comprises a crank means for imparting a rotational force to move said waste removal scoop through said litter to thereby remove cat waste material from said litter and dispose of said waste material into said storage container.

19. The apparatus according to claim 18 wherein said crank means includes a ratchet handle.

20. The apparatus according to claim 18 wherein said crank means includes a gear motor.

21. The apparatus according to claim 18 further comprising at least one braking pad integrally attached to an inner top portion of said housing for braking an excess force of said waste removal means as said sifting screen is forced downwardly against said storage container.

22. The cat litter box of claim 13, wherein said at least partially enclosed top includes a guide for guiding said waste removal means along a portion of said path extending along the upper portion of said housing.

23. The cat litter box of claim 13, wherein said waste removal scoop includes a sifting screen.

24. A litter box comprising:
a housing for holding pet litter;
a waste removal member for passing through said litter and removing waste therefrom;
a storage container mounted to said housing for retaining waste removed from said housing by said waste removal member; and
a transport mechanism for moving said waste removal member through said litter and to a location for depositing waste removed by said waste removal member into said storage container, and wherein said transport mechanism subjects the waste removal member to an impact force when said waste removal member is adjacent said storage container, thereby assisting removal of waste from said waste removal member for depositing into the storage container.

* * * * *